(12) United States Patent
Fritsch et al.

(10) Patent No.: US 9,352,746 B2
(45) Date of Patent: May 31, 2016

(54) LANE RELATIVE POSITION ESTIMATION METHOD AND SYSTEM FOR DRIVER ASSISTANCE SYSTEMS

(71) Applicant: HONDA RESEARCH INSTITUTE EUROPE GMBH, Offenbach/Main (DE)

(72) Inventors: Jannik Fritsch, Mühlheim (DE); Tobias Kühnl, Frankfurt am Main (DE)

(73) Assignee: HONDA RESEARCH INSTITUTE EUROPE GMBH, Offenbach Main (DE)

( * ) Notice: Subject to any disclaimer, the term of this patent is extended or adjusted under 35 U.S.C. 154(b) by 0 days.

(21) Appl. No.: 14/601,584

(22) Filed: Jan. 21, 2015

(65) Prior Publication Data

US 2015/0203114 A1    Jul. 23, 2015

(30) Foreign Application Priority Data

Jan. 22, 2014 (EP) ..................................... 14152164

(51) Int. Cl.
| | |
|---|---|
| *B60W 30/08* | (2012.01) |
| *B60W 30/10* | (2006.01) |
| *B60W 30/12* | (2006.01) |
| *G06K 9/00* | (2006.01) |

(52) U.S. Cl.
CPC ........... *B60W 30/12* (2013.01); *G06K 9/00798* (2013.01)

(58) Field of Classification Search
USPC .......................................................... 701/41
See application file for complete search history.

(56) References Cited

U.S. PATENT DOCUMENTS

| | | |
|---|---|---|
| 6,212,453 B1 | 4/2001 | Kawagoe et al. |
| 7,151,996 B2 | 12/2006 | Stein |
| 2007/0198146 A1 | 8/2007 | Ikeda et al. |
| 2010/0191421 A1* | 7/2010 | Nilsson ............... B62D 15/025 701/41 |
| 2010/0209892 A1* | 8/2010 | Lin ...................... G09B 19/167 434/71 |
| 2010/0211270 A1* | 8/2010 | Chin ..................... B62D 6/007 701/44 |
| 2011/0044503 A1 | 2/2011 | Sato |

(Continued)

FOREIGN PATENT DOCUMENTS

| | | |
|---|---|---|
| EP | 2 574 958 A1 | 4/2013 |
| JP | 2007-004669 A | 1/2007 |
| WO | WO 2012/126650 A1 | 9/2012 |

OTHER PUBLICATIONS

Daniel Toepfer et al., "Efficient Scene Understanding for Intelligent Vehicles Using a Part-Based Road Representation," Proceedings of the 16th International IEEE Annual Conference on Intelligent Transportation Systems (ITSC 2013), The Hague, The Netherlands, Oct. 6-9, 2013, pp. 65-70.

(Continued)

*Primary Examiner* — Yonel Beaulieu
(74) *Attorney, Agent, or Firm* — Squire Patton Boggs (US) LLP

(57) ABSTRACT

The invention relates to a system and method for lane relative position estimation. The environment of a vehicle is first sensed, and spatial features are then extracted and classified from information obtained from the sensing. The spatial features capture lateral position information within a lane, and an output signal including the result of the classification, which represents the relative lateral positioning of a road location with respect to the overall lane shape, is generated.

22 Claims, 3 Drawing Sheets

(56) References Cited

U.S. PATENT DOCUMENTS

| | | |
|---|---|---|
| 2011/0063097 A1 | 3/2011 | Naka et al. |
| 2011/0187863 A1 | 8/2011 | Glander et al. |
| 2012/0253602 A1 | 10/2012 | Fujita et al. |

OTHER PUBLICATIONS

European Search Report dated May 23, 2014 corresponding to European Patent Application No. 14152164.1.

Nicholas Apostoloff, "Vision based lane tracking using multiple cues and particle filtering," Aug. 2, 2004, The Australian National University, Department of Systems Engineering Research School of Information Sciences and Engineering, pp. 1-170, XP055117978, retrieved from Internet: url:http://citeseerx.ist.psu.edu/viewdoc/download?doi=10.1.1.72.1911&rep=rep1&type=pdf.

Tobias Kuhnl, "Road Terrain Detection for Advanced Driver Assistance Systems," May 21, 2013, Technischen Faultat der Universitat Bielefeld, XP055117968, pp. 1-152, section 2.2. "Approaches employing Spatial Features," Chapter 5. "Incorporating the Spatial Layout of Local Visual Appearance."

Hendrik Weigel, et al., "Vehicle Tracking with Lane Assignment by Camera and Lidar Sensor Fusion," Intelligent Vehicles Symposium, 2009 IEEE, Jun. 3, 2009, pp. 513-520, XP031489894.

Aharon Bar Hillel et al., "Recent progress in road and lane detection: a survey," Machine Vision and Applications, vol. 25, No. 3, Apr. 1, 2014, pp. 727-745, XP055113665.

\* cited by examiner

LANE RELATIVE POSITION ESTIMATION METHOD AND SYSTEM FOR DRIVER ASSISTANCE SYSTEMS

BACKGROUND

1. Field

The present invention discloses a method and system for lane relative position estimation for driver assistance systems or autonomous driving. Driver assistance systems may be part of a car, bike, scooter or any other road vehicle.

The invention is in the field of driver assistance based on computer vision or other sensing techniques perceiving the surrounding of a vehicle, in particular a road vehicle, and processing the sensory input to generate system relevant information.

The invention can in particular be implemented in a sensor-based computing module, which can be part of a car, a motorbike, or any other land-based vehicle. The invention can be applied in realistic real-world traffic environments, such as e.g. encountered when driving a car on inner-city roads.

2. Description of the Related Art

In modern vehicles a human driver is often assisted by "active safety systems". Such active safety systems (in the following also referred to as "driver assistance systems"), which can e.g. be a lane keeping assistance system as described in U.S. Pat. No. 6,212,453 B1, physically sense the environment of the vehicle and extract information which then can be used for performing a driver assistance function. Based on this sensor signal processing the driver assistance system outputs a signal which can be fed to visual and/acoustic representations means, or it can be fed to an actuator the action of which alters the state of the vehicle. Such actuation can for example influence steering, decelerating or accelerating of a vehicle. Furthermore, pre-tensioning of a safety belt or deployment of an airbag system may be based on information contained in such signal.

State-of-the-art lane keeping assistance systems focus on the detection of the lane delimiting elements. For this, they typically detect the position of lane markings as described in US 20070198146 A1, JP 2007004669 A, or US 2011044503 A1. Alternatively curbstones can be detected which is described in US 20110063097 A1. But the determination of a lane area on the basis of lane delimiting elements can of course be based on other lane delimiting elements such as barriers as known from US 2011187863 A1. The determination is performed by processing signals obtained from a sensor.

A vehicle which comprises such a system and for which a traffic situation shall be analyzed or evaluated is called ego-vehicle and the lane on which such ego-vehicle currently is located is called ego-lane. These systems use the positions or course of detected delimiting elements for extracting a parameterized description of the ego-lane, e.g. curvature, width, or length of the ego-lane ahead. To this end, a particular lane model as described in U.S. Pat. No. 7,151,996 B2 can be used for extracting and tracking of model parameters based on the detected course of delimiter positions. Based on the lane model parameters, the lateral positioning of the current (or future) ego-vehicle locations within the lane can then be obtained.

Instead of detecting the delimiting elements directly, also a part-based representation has been used for lane/road detection which is disclosed in "Efficient Scene Understanding for Intelligent Vehicles Using a Part-Based Road Representation", D. Toepfer, J. Spehr, J. Effertz, C. Stiller, Intelligent Transportation Systems Conference 2013. A part is defined as a 2D lane area having a width and height and delimiters on right and left side each. Instead of an explicit binary detection, a probability value for edge/lane marking detection is allowed. By applying variations of the 2D basic area (position, orientation, width, height) one obtains a probability distribution of lane parts in an image. These lane parts have been fused in a hierarchical representation to detect 1) the overall lane shape as concatenation of lane parts and 2) the overall road consisting of several lanes. Again, this road model then allows calculating the lateral positioning of other vehicles and the ego-vehicle.

Lateral positioning is highly relevant for lane keeping assistance systems and is termed the lane relative position in the context of the present invention. In general, the lane relative position can be defined as continuous value that represents the lateral positioning of a particular location of a road within its lane, i.e., relative to its lane boundaries.

For example, identifying the lane relative position of a location on the road can be used as indication how well the ego-vehicle is currently laterally centered within its lane which is described in WO 2012/126650 A1 or whether it is currently driving close to a lane delimiter. This lane relative position can be used for providing information to the driver to support him in the task of safe centered driving. Such assisted centered driving becomes more important, because new vehicles often are less clearly laid out an thus the driver has difficulties in recognizing the relative position of the vehicle in the lane himself.

This lane relative position can also be used directly for other driver assistance systems such as lane keeping assistance systems or lane departure warning assistance systems or for autonomous driving.

SUMMARY

Target of the method and system for lane relative position estimation is assisting vehicle drivers in the task of driving by providing a signal comprising information regarding relative position on a lane on the basis of which a visual or acoustical information may be generated, or autonomous vehicle control may be preformed.

A problem of known systems is that an indirect estimation of such relative position is made. In a first step the delimiters of a lane are determined and only then, using this information, any positional information of locations can be derived. It is therefore an object to improve the estimation of road locations on the basis of signals obtained from sensor means capturing the real situation of the environment of e.g. a vehicle.

Therefore, the invention proposes the estimation of the lane relative position of a particular road location as a direct determination of the lane relative position by processing of spatial features generated from sensor data (meaning at least one signal which is obtained from a sensor means). Importantly, the spatial features do not require an explicit detection of boundary elements like, e.g., lane markings or curbstones or complete 2D lane parts, and therefore the computational effort is reduced compared to common systems.

The invention comprises particularly two aspects:
1) The direct determination of a preferably continuous lane relative position on the basis of spatial features using a lane relative position classifier.
2) The training signal for a classifier to directly generate a lane relative position as output signal.

The problem is solved by the system and method according to the independent claims.

The method and system according to the invention estimate the lateral positioning of a road location within its lane by extracting the lane relative position value. The basis for this extraction are spatial features that capture geometrical aspects of lanes in a road environment and that are extracted from information that is included in signals that are obtained from sensor means. Such sensor means may be a camera for image capturing which is arranged at a windshield of a vehicle to sense the environment ahead of the vehicle. Importantly for the present invention, spatial features extracted from the information of the sensor means capture the lateral positioning with respect to the road/lane delimiters for a particular location on a lane, i.e., a lateral location change results in a different spatial feature value.

A trivial spatial feature would be the distance value from a particular location on the lane to a detected lane. However, this would necessarily require the explicit detection of the lane boundary or a 2D lane part. In contrast to this, the present invention proposes a direct classification of the lane relative position from other spatial features without such kind of explicit detection of lane delimiter in a first step. Thus, for the present invention the spatial feature may include any information having a correlation with a particular location on a lane exclusive a distance value.

For the present invention it is not particularly relevant in which way such spatial features are generated and there is a plurality of ways known from the state of the art. But for further explanation it is assumed that the generation of the spatial features is performed as described in EP 2574958 A1 in detail. The content thereof and all features described therein are therefore explicitly referenced in respect of the generation of the spatial features. Such a feature extraction process is realized by a combination of visual and spatial features. This feature computation method provides spatial features with respect to a defined location, e.g., on the road or within a particular lane. Such spatial features capture the spatial layout of a multitude of scene elements like, e.g., all kinds of road and lane delimiters or the extent of the road area in a holistic manner.

In the proposed lane relative position classification according to the present invention, the output of a feature computation method, i.e., the spatial features, such as part of EP 2574958 A1 is used as input. As already mentioned above, generally any feature computation method could be used that generates spatial features allowing the distinction of locations with different lane relative positions", i.e., laterally neighboring locations within a lane. Importantly, the feature computation considers an area of some road entity (like, e.g., the asphalt area, curbstones, vehicles).

Based on the spatial features, the lane relative position classifier estimates the lateral positioning of a road location within its lane, i.e., a lane relative position value is generated.

A lane relative position classifier could be for instance realized by applying standard machine learning algorithms. For instance, a Support Vector Machine, a Neuronal Network, or the AdaBoost algorithm can be applied as lane relative position classifier. As an output of the classifier a signal including information about the lane relative position is generated which may then be used for further evaluation or actuation.

Advantageous aspects and features of the invention are claimed in the dependent claims.

The lane relative position is preferably represented by a continuous value, but may also be realized as discrete value for technical or other implementation reasons.

In order to enable a classifier to output such lane relative position value using machine learning, the classifier has to be trained with an adequate training signal. Preferably a special training signal for the lane relative position classifier is utilized. In prior art, e.g., EP 2574958 A1, binary training signals are used to train a classifier to discriminate two classes such as road vs. non-road. Typically, for training a classifier to discriminate a multitude of classes, e.g., different lanes, a discrete training signal is applied. This means for each particular class, say, a particular lane, the training signal is a constant value. In contrast to prior art, for the present invention the utilization of a training signal which reflects the properties of the lane relative position is proposed, i.e., contains different values for laterally neighboring locations within a particular lane.

For instance, consider a training signal T containing multiple samples t, in the continuous range from zero to one within a particular lane. For instance:

If a training sample t, corresponds to a road location and is close to a left lane delimiter the value is close to zero.

If a training sample t, corresponds to a road location that is close to a lane center the value is close to 0.5.

If a training sample t, corresponds to a road location that is close to a right lane delimiter the value is close to 1.

As a result of the training strategy that is explained above, the lane relative position classifier generates for at least one road location the lane relative position represented by a continuous lane relative position value $P_1$. In this example, the lane relative position value is a value in the range of zero to one: $P_1$ equal to Zero indicates that the current road location is at a lateral position which corresponds to the very left of the lane. $P_1$ equal to one indicates that the current location is at a lateral position which corresponds to the very right of the lane.

This means, a lane relative position value states for any location on a lane how close the location is for instance to the lane center or to a lane delimiter. Therefore, the lane relative position estimation method can be used in a Driver Assistance System, because the lane relative position values of future ego-vehicle locations indicate deviation of the vehicle's driving path from the lane center or a departure from the lane. Future ego-vehicles locations can be obtained from vehicle state parameters such as velocity and steering wheel angle for example.

The spatial relation to a road entity can be extrinsic or intrinsic, which means that the spatial relation captures the geometric properties of the road location relative to a road entity or captures the geometric properties of the road location that is positioned within the area covered by the scene element.

In a preferred embodiment, the lane relative position value is extracted for one road location, in order to extract information about the course of the lane at this road location. The advantage is that it is easily possible to assist a driver to center his vehicle on the current lane.

In another preferred embodiment, multiple road locations are analyzed in order to extract the course of multiple lanes or the overall road. This is in particular advantages when in addition to the ego-lane a wider area and the behavior of other traffic participants shall be included in the driver assistance. This could be useful in trajectory planning for supporting lane changing maneuvers or any kind of driving path detection.

Furthermore it is preferred that a Human Machine Interface (HMI) communicates the lane relative position of the expected future vehicle location to the driver of a vehicle in order to warn about a critical lateral position of the vehicle.

Alternatively or additionally the Human Machine Interface may provide feedback to the driver about the lateral positioning within its lane in order to improve the driver's driving skill.

It is particularly advantages, if the system comprises a depth sensor, so that the depth determined by such depth sensor is used in addition to the lane relative position determined by the system. A "depth sensor" may also be realized by use of a stereo camera where the depth is estimated by image processing of a stereo image that is captured by the stereo camera.

BRIEF DESCRIPTION OF THE DRAWINGS

Aspects and features of the invention will now be described with reference to the drawings in which.

DETAILED DESCRIPTION

Figure 1:
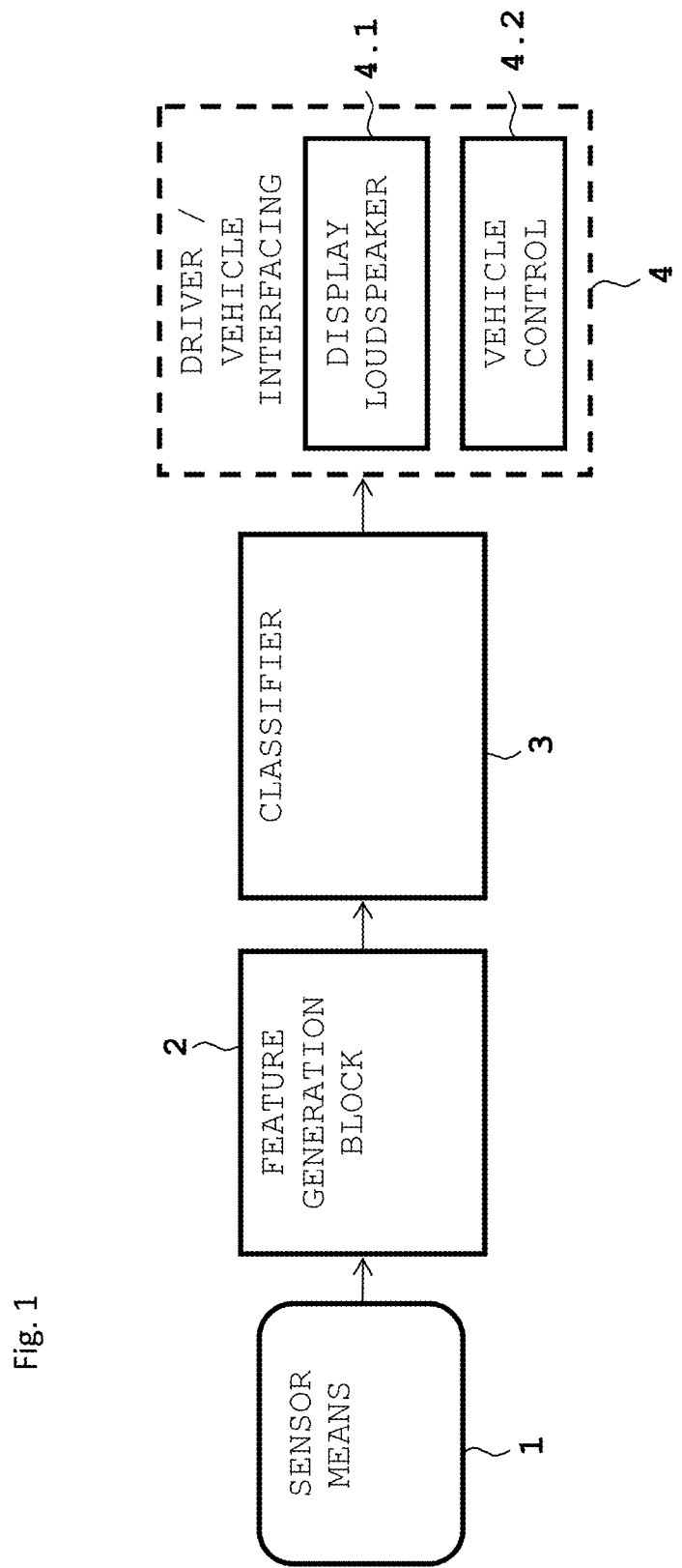
FIG. 1 is a block diagram illustrating one example of a configuration of the present invention used for driver assistance in a car.

FIG. 1 shows a block diagram of a Driver Assistance System in which the present invention may be implemented. At the same time the single blocks represent different steps of performing the present method.

In the first step the environment of an ego-vehicle is sensed. This could be performed by any sensor means that is suitable to generate information that allows deriving knowledge about spatial relations of the sensed real situation. Besides a camera that is used preferably, this could be achieved by a radar or sonar sensor as sensing means. It is of course also possible that such units in combination form the sensing means.

The signal that is output by the sensing means 1 is transferred to a feature generation block 2, which as mentioned above may function as explained in EP 2 574 958 A1. In the feature generation block 2 the spatial features are extracted. Before the signals that are output from the sensing means 1 are transferred to the feature generation block 2, it is also possible to pre-process the signals. This is particularly useful if a plurality of signals is used as a basis for spatial feature extraction which are obtained from a plurality of different sensing units.

The spatial features that have been generated in the spatial feature generation block 2 are then supplied to classifier 3. In classifier 3 the classification is performed to output a lane relative position value or a signal including information about the lane relative position. As described earlier this is preferred a continuous value representing a particular location relative to the lane in direction of the lane width.

Finally this lane relative position value is output and further analysis may be performed. As an example for further use of the output of the classifier an interface 4 is illustrated in FIG. 1. Instead of analyzing it is also possible that on the basis of such lane relative position value a driver warning is generated. As it is indicated by the display/loudspeaker 4.1 a warning that is generated on the basis of the output signal may be a visual warning or an acoustic warning. An example of a visual warning depending on the lane relative position will be described with reference to FIGS. 2a-2e. Alternatively a direct interaction can be performed such as correcting a steering angle or activating any other actuator of the vehicle which is dedicated to effect a change of the status of the vehicle. The possible actuators are summarized by the vehicle control 4.2.

Figure 2A:
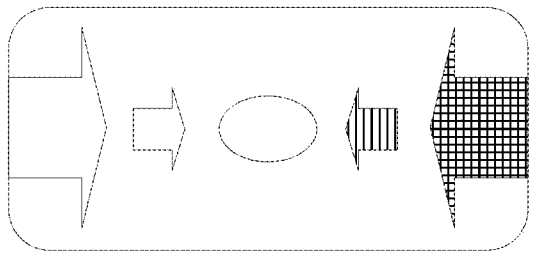
FIGS. 2a-2e show a display with five different stages as an example for an HMI.
Figure 2B:
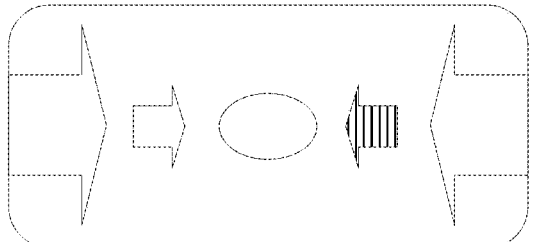

An example for the generation of a visual driver warning is shown in FIGS. 2a-2e. Based on the lane relative position of a single expected ego-vehicle's future road location the HMI illustrates the expected lateral positioning within the ego-lane in order to help the driver choosing an optimal lateral lane position. This is for example helpful in narrow highway road works where lane centering is difficult for the driver. Depending on the lane relative position that is output it is possible to determine how far from the center of a lane the ego-vehicle is positioned. In case of a large offset from the ideal relative position to the right that does not need to be the center of the lane necessarily the driver may be warned by a double arrow as depicted in FIG. 2a). When a relative small offset is recognized only a single and smaller arrow indicating the correction direction needed is displayed, as illustrated in FIG. 2b).

Figure 2C:
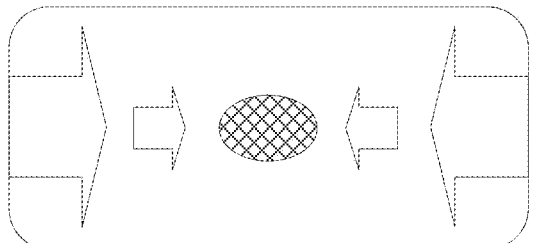
Figure 2D:
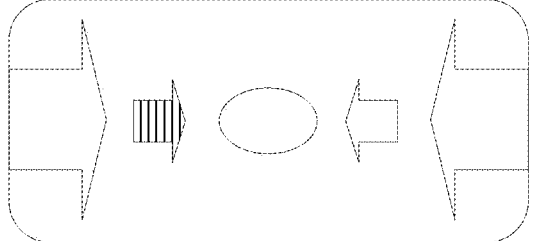

If the vehicle is already in the center of the lane (or at the ideal relative position in the lane, in case this is not the center) an ellipse or a green dot or the like as in FIG. 2c) is shown for example. Of course, similar to FIGS. 2a) and 2b) the same may be performed for a deviation to the left as shown in FIGS. 2d) and 2e).

It is self explanatory that the examples given in FIGS. 2a-2e are not binding and that any other way of visualizing a correction that is needed to be performed by a driver in order to bring the vehicle back to its perfect lane position can be used.

Figure 3:
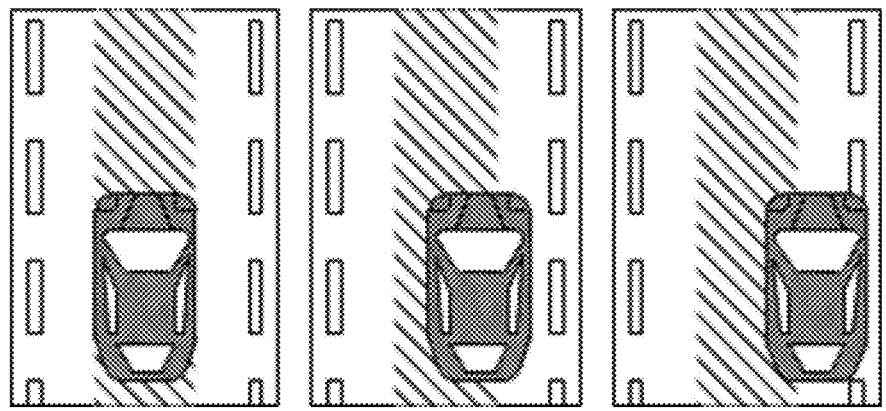
FIG. 3 shows an illustration of situations with and without critical lane relative position values.

FIG. 3 shows three situations: First the vehicle is centered correctly (left image). Second a minor offset to the right can be recognized (middle image) and finally a critical lane position of the vehicle can be recognized (right image).

Figure 2E:
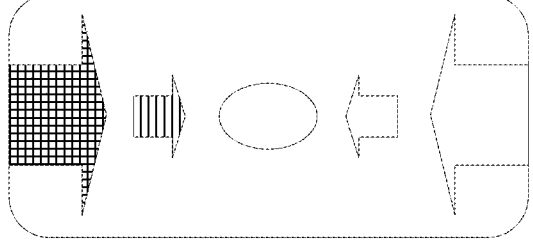

As it has been described with reference to FIGS. 2a-2e in case of an estimated critical lane relative position, an HMI can be used to warn the driver of the vehicle. Such critical lane relative position can be defined by two thresholds $T_1$ and $T_2$. If $P_1 \leq T_1$ the lane relative position is critical (left), if $P_1 \geq T_2$ the lane relative position is critical (right). The resulting warning would be as shown in FIG. 2e) and in FIG. 2a) respectively. In the case the lane relative position value confirms $T_1 > P_1 \geq T_2$ the vehicle is not in a critical state. But still the vehicle may not be precisely centered. In order to further assist a driver in a situation that is shown in FIG. 3 in the middle, a further threshold for a relatively small offset for each side may be introduced and be used for causing a warning like shown in FIG. 2d). The same may be done of course for a not critical offset to the right. Further setting such second threshold for each side ensures that not any arbitrary small offset from the center leads to a warning of the driver. An overreaction of the driver can thus be prevented.

Beyond positioning aspects of locations on the lane the ego-vehicle is driving, also lane relative positions of road locations on neighboring lanes are useful information. For example, the lane relative position can be used to find locations on other lanes which are centered within their corresponding lanes ($P_i = 0.5$).

Figure 4:
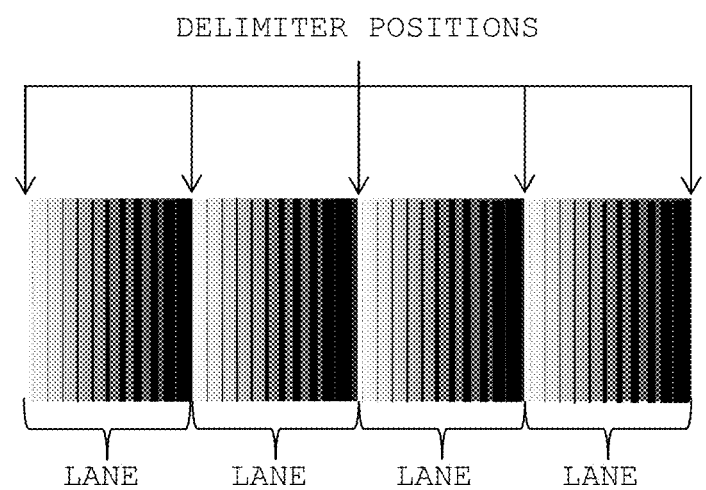
FIG. 4 illustrates lane relative positions for a four-lane road.

This leads to an application of the proposed method for multiple road locations which supports the identification of the course of multiple lanes, e.g., by identifying characteristic patterns of the lane relative position values of lanes in the road environment:
  lateral neighboring locations belonging to the same lane exhibit a linear gradient on the lane relative position value (see FIG. 4), lateral neighboring locations between two lanes exhibit a discontinuity of the lane relative position value (see FIG. 4).

In FIG. 4 white indicates a low lane relative position value P1. Black indicates a high lane relative position value P1. It can be seen in FIG. 4 that neighboring road locations at a transition from one lane to the next corresponds to an change from black to white or vice versa. Thus, the corresponding discontinuity of the lane relative position value $P_l$ clearly indicates a position belonging either to the one or the other lane.

Therefore, for example a linear model fitting on laterally neighbored locations could be employed to detect and separate multiple lanes.

An important difference to existing state-of-the-art is the aspect that the proposed scheme obtains for each location a value P1 without requiring a specific lane shape and thus without explicitly determining delimiters of the lane. In other words, if the lane is narrower or wider than standard lane size which could be caused by a parked car or the beginning additional lane or inner city roads, the classification will still provide an appropriate value if the underlying features are also not based on the expectation of a specific lane shape. This is in contrast to state-of-the-art position estimation which calculates the distance on an explicit model or an implicit lane part model.

For training the classifier a basic strategy was explained above. This strategy might be advantageously extended as follows: The lane relative position enables to capture the overall road area as composition of individual lanes. The boundary of the road consists of the outer boundaries of the outer lanes. In order to achieve a good separation of the road from the outer vicinity of the road, the training signal may also comprise samples laterally outside a road, e.g., for enabling a clear distinction of lateral locations within a road from the outer vicinity of the road.

While inner vicinity (I-region) describes the part of the road area that is close to a road delimiter, the outer vicinity (O-region) describes a region outside of the road area that is close to the road delimiter. This may be important for the usage in ADAS (Advanced Driver Assistance Systems), e.g., Road Departure Warning. For estimating a critical lane relative position it may be important to distinguish a lane relative position from the I-region, the O-region, and the rest of the road area.

For the explanation of the structure of the invention and the details thereof, an Advanced Driver Assistance System was used. But the invention may also used for autonomous vehicles. This is particularly evident, when the lane relative position signal that is output by the classifier is used to generate a control signal that directly actuates a steering system of a vehicle.

The invention claimed is:

1. A method for lane relative position estimation, wherein this method comprises:
   sensing the environment of a vehicle with at least one sensor means;
   extracting spatial features from information obtained from the sensor means;
   classifying the extracted spatial features, wherein the spatial features capture lateral position information within a lane by including information having a correlation with a particular location on the lane,
   wherein a lateral location change results in a different spatial feature value, and
   wherein the classifying generates directly as a result a lane relative position estimation; and
   outputting in an output signal the result of the classification which represents the relative lateral positioning of a road location with respect to an overall lane shape.

2. The method according to claim 1, wherein
a continuous lane relative position value is obtained by the classification of the extracted spatial features.

3. The method according to claim 1, wherein
a classifier that performs classification is trained by means of a training signal which contains different lane relative position values for laterally neighboring locations within a particular lane.

4. The method according to claim 1, wherein
information contained in the spatial features represents spatial relation of the road location to at least one road entity with an associated area in the two-dimensional road environment.

5. The method according to claim 4, wherein
the spatial relation to a road entity is capturing the geometric properties of the road location relative to a road entity.

6. The method according to claim 4, wherein
the spatial relation to a road entity is capturing geometric properties of the road location that is positioned within the area covered by the scene element.

7. The method according to claim 2, wherein
the lane relative position value is extracted for one road location, in order to extract information about the course of the lane at this road location.

8. The method according to claim 1, wherein
multiple road locations are analyzed in order to extract the course of multiple lanes or the overall road.

9. The method according to claim 1, wherein
a human machine interface (HMI), communicates the lane relative position of an expected future vehicle location to a driver of a vehicle in order to warn about a critical lateral position of the vehicle.

10. The method according to claim 1, wherein
a human machine interface (HMI) provides feedback to a driver about the lateral positioning within its lane in order to improve the driver's driving skill.

11. The method according to claim 1, wherein
a depth sensor provides additional depth information.

12. A system for lane relative position estimation, comprising sensor means sensing the environment of a vehicle, a spatial features generating block for extracting spatial features from information obtained from the sensor means and a classifier for classifying the extracted spatial features, wherein
   the spatial feature generating block is configured to generate spatial features that capture lateral position information within a lane by including information having a correlation with a particular location on the lane, wherein a lateral location change results in a different spatial feature value, and
   the classifier is configured to generate directly as a result the lane relative position estimation, and to output in an output signal the result of the classification which represents the relative lateral positioning of the road location with respect to an overall lane shape.

13. The system according to claim 12, wherein
the classifier is configured to output a continuous lane relative position value obtained by the classification of the extracted spatial features.

14. The system according to claim 12, wherein the classifier is trained by means of a training signal which contains different lane relative position values for laterally neighboring locations within a particular lane.

15. The system according to claim 12, wherein information contained in the spatial features represents a spatial relation of the road location to at least one road entity with an associated area in the two-dimensional road environment.

16. The system according to claim 12, wherein the spatial relation to a road entity captures geometric properties of the road location relative to a road entity.

17. The system according to claim 12, wherein the spatial relation to a road entity captures geometric properties of the road location that is positioned within the area covered by the scene element.

18. The system according to claim 13, wherein the classifier is configured to extract the lane relative position value for one road location, in order to extract information about the course of the lane at this road location.

19. The system according to claim 12, wherein the classifier is configured to analyze multiple road locations in order to extract the course of multiple lanes or the overall road.

20. The system according to claim 12, wherein the system comprises a human machine interface (HMI) that communicates the lane relative position of the expected future vehicle location to a driver of a vehicle in order to warn about a critical lateral position of the vehicle.

21. The system according to claim 12, wherein the system comprises a human machine interface (HMI) that provides feedback to a driver about the lateral positioning within its lane in order to improve the driver's driving skill.

22. The system according to claim 12, wherein the system comprises a depth sensor that provides additional depth information.

\* \* \* \* \*